United States Patent [19]

Tomita et al.

[11] 4,053,885

[45] Oct. 11, 1977

[54] MOVING TARGET INDICATION RADAR

[75] Inventors: Yuichi Tomita; Takeru Irabu; Eiichi Kiuchi, all of Tokyo, Japan

[73] Assignee: Nippon Electric Company, Ltd., Tokyo, Japan

[21] Appl. No.: 673,323

[22] Filed: Apr. 5, 1976

[30] Foreign Application Priority Data

Apr. 3, 1976 Japan .............................. 51-40628
Mar. 29, 1976 Japan .............................. 51-34959

[51] Int. Cl.² .............................................. G01S 9/42
[52] U.S. Cl. .............................. 343/7.7; 343/5 DP; 343/7 A
[58] Field of Search ............... 343/5 DP, 5 VQ, 7 A, 343/7.7

[56] References Cited

U.S. PATENT DOCUMENTS

| 3,353,177 | 11/1967 | Wilmot | 343/5 VQ |
| 3,701,149 | 10/1972 | Patton et al. | 343/7 A X |
| 3,707,718 | 12/1972 | Ames | 343/7.7 |
| 3,950,748 | 4/1976 | Busy | 343/7 A |
| 3,987,442 | 10/1976 | McLeod, Jr. | 343/7.7 |

Primary Examiner—T.H. Tubbesing
Attorney, Agent, or Firm—Sughrue, Rothwell, Mion, Zinn and Macpeak

[57] ABSTRACT

A moving target indication radar is disclosed in which the zero-Doppler-speed components of the radar return signal are eliminated by correlation processing in the azimuthal direction. In some cases, a similar correlation processing is concurrently performed in the range direction. The moving target indication radar has both a radar signal analog processing portion and a radar signal digital processing portion. The received pulse returns are processed by quadrature phase detectors to provide outputs which are in phase and quadrature phase analog data signals representing real and imaginary parts of the Doppler frequency data. These signals are converted to corresponding digital words which are then divided into a plurality of digital Doppler frequency components by a discrete Fourier transform circuit. A buffer memory is connected to store the outputs of the discrete Fourier transform circuit. An amplitude calculator selectively receives the outputs of the buffer memory and computes the root-mean-square value for each output of the discrete Fourier transform circuit stored in the buffer memory. A second buffer memory is connected to store the outputs of the amplitude calculator, and a correlation processing circuit averages the outputs of the second buffer memory which represent the data of a plurality of every n-th one of the unit azimuthal regions and subtracts the average output from the data for the center of the plurality of unit regions.

7 Claims, 8 Drawing Figures

MOVING TARGET INDICATION RADAR

The present invention relates to a moving target indication radar and, more particularly, to a radar of this kind so designed for use as an ASR (airport surveillance radar) or an ARSR (air route surveillance radar) that can display the returns from moving targets including those of close-to-zero relative radial speeds while eliminating not only the ground clutter attributed to buildings and undulating terrains but also the moving clutter caused by sea surface, large flocks of birds and rain clouds.

Although the radar of this invention is not limited in its application to air traffic control, the following description will be given in conjunction mainly with this field of use.

The conventional radar signal processing technique, known as MTI (moving target indication), for eliminating from a radar signal the returns from stationary objects to detect only the moving target returns for display has been in extensive use. An MTI canceller is made of a delay line and a subtractor combined to give the so-called comb filter characteristic, which is effective to eliminate the ground clutter having close-to-zero frequency components.

However, it is impossible for the MTI canceller to detect such a target as an aircraft flying tangentially to the radar and consequently having zero or close-to-zero Doppler speed with respect thereto, because the returns from such target are totally eliminated together with the returns from the stationary objects, i.e., ground clutter. In other words, the conventional MTI canceller inevitably involves the problem of blind speed.

Another problem unavoidable with the MTI canceller is that the moving clutter having Doppler speed components can never be eliminated. In a radar system utilizing the MTI canceller, therefore, the desired moving target indication is obscured by the moving clutter. A typical example of such moving objects causing the moving clutter is the so-called sea clutter caused by waves. The sea clutter, which ordinarily has a Doppler speed of a few meters per second, spreads as extensively as the ground clutter and greatly affect the quality of the desired indication of moving targets.

Besides the sea clutter, the moving clutter includes the so-called "angle echo" caused by large flocks of migrating birds, and the weather clutter caused by rainfall and rain clouds. Since the area of radar application most vulnerable to these ground clutter lies in air traffic control, there has been a great demand for an improved clutter elimination technique to secure the safety of the ever-increasing air traffic.

Among the conventional techniques designed to meet this requirement, Log-CFAR (Logarithmic Amplification and Constant False Alarm Rate) technique is based on the fact that the sea and weather clutter has an amplitude distribution similar to the Rayleight distribution. The Log-CFAR technique employing the combination of a logarithmic and a CFAR circuit is capable of suppressing the clutter components to a level comparable to the noise level inherent to the radar receiver (For further details, reference is made to a paper entitled "Detection Performance of the Cell Averaging Log/CFAR Receiver" by V. G. Hansen and H. R. Ward, IEEE Trans. of AES, AES-8, p. 648, 1972). However, the desired target detection is impossible for the Log-CFAR technique when the target returns are not higher in level than the moving clutter.

Another example of the conventional clutter eliminating technique is the so-called clutter locking. (For details, reference is made to F. E. Natherson, Radar Design Principles, p. 327-328, McGraw Hill, 1969). However, a sufficient clutter elimination cannot be expected with this technique if there are two different kinds of clutter involved significantly differing in Doppler frequency. Furthermore, even high-level target returns can be eliminated if there is virtually no clutter in the scanned space.

These difficulties involved in these conventional Log-CFAR and clutter locking techniques are attributed to the signal processing performed in the time domain. For the same reason, the separate recognition of two or more targets are impossible if they are in the same range from the radar and differ in Doppler speed.

To solve these problems, the signal processing in the frequency domain has come to be used. For this problem, the radar signal must be converted through Fourier transform to various clutter and target components mutually separated in frequency domain. The Fourier transform and the subsequent signal processing must be performed on the real time basis. The recent progress in LSI technology has made it possible to achieve the fast Fourier transform resorting to the algorithm proposed by J. W. Cooley and J. W. Tukey. (For details, reference is made to "An Algorithm for the Machine Calculation of Complex Fourier Series," Mathematics Computation, p. 297-301, April 1965). Under the circumstances, further progess in the application of the real-time radar signal processing can be expected.

However, the mere conversion of a radar signal to several Doppler frequency groups does not make the detection of target returns possible.

To overcome this difficulty, C. E. Muehe and his collaborators have proposed an MTD (moving target detector) capable of signal processing in the frequency domain to detect targets in the presence of various clutter. (For details, reference is made to C. E. Muehe et al "Digital Signal Processor for Air Traffic Control Radars," IEEE NEREM'74 Proceedings, p. 28-31, October 1974). The MTD, which is totally digitized for signal processing, employs two separate signal processing means, one for the ground clutter elimination and the other for the moving clutter elimination. More specifically, the radar signal received from the scanned space is converted first to a digital signal and applied through a buffer memory to an MTI canceller and an 8-point DFT (discrete Fourier transform) circuit, where the conversion of the digitalized radar signal to eight Doppler frequency groups is performed. On the other hand, the core memory output is supplied, through a zero-Doppler speed component detector provided in parallel with the serially connected MTI canceller and the 8-point DFT and a recursive filter, to a magnetic disc memory to form a "clutter map". Also, the eight Doppler frequency group outputs from the 8-point DFT circuit are subjected to weighting between the every two adjacent frequency components and then to the range-correlation processing, respectively, for a clutter-free display. The range-correlation processing or the range averaging is performed with respect to a predetermined radial distance. The range-correlation processing is performed by the averaging of the radar return levels with respect to a plurality of unit radial regions covering the predetermined radial distance.

Since a target has a limited length in the radial direction, the target return can be detected by the threshold control performed depending on the average radar return level obtained with respect to the mentioned radial regions with the unit region under processing lying in their center. In contrast, since the clutter generally has a wider radial spread and contributes more greatly to the average value, it is eliminated by the mentioned averaging and the threshold control.

Meanwhile, the magnetic disc memory stores the zero-doppler speed components for each of the unit azimuth regions. The magnetic disc memory is adapted to store the zero-Doppler speed components on a single recording track for every coherent processing interval (CPI) equal to ten radar pulse repetition period. Also, one-revolution sweep (360°) is divided into 480 CPI's, with every CPI accommodating the radar data for 768 unit range regions. It follows therefore that the disc memory must have $480 \times 768 (= 368,640)$ unit memory regions. Since 10 bits are assigned to each of the unit range region radar data in the MTD, the magnetic disc has a $480 \times 768 \times 10 (= 3,686,400)$-bit memory capacity. Owing to the recursive filter replacing 1/8 of the memory content for every radar scanning pulse, the stored data represent the time averaged zero-Doppler spaced data for all the unit azimuth — range regions. The stored data is accessed every four memory tracks (4 CPI's) to permit the averaging among the readout data.

As described, the readout of the stored data synchronized with the scanning by the radar pulse covers an azimuthal region corresponding to 4 CPI's or 40 pulse repetition periods thereby to permit the averaged readout data to eliminate the clutter components through the threshold control. Also, the time-averaging combined with the correlation processing in the azimuthal direction is performed for every unit range-azimuth azimuth region, making it possible to detect a moving target flying tangentially or having a close-to-zero Doppler speed.

As stated above, the MTD has provided one solution to the above-mentioned problems unavoidable with the conventional clutter elimination techniques. However, it requires such a large capacity memory equipment as the magnetic disc. Furthermore, the problem unavoidably coming from the use of the MTI canceller, i.e., the deterioration of the S/N ratio for target returns from a clutter-free space, cannot be solved with the MTD. (For further details, reference is made to G. M. Dillard "Signal-to-Noise Ratio Loss in an MTI Cascaded with Coherent Integration Filters," The Record of IEEE 1975 International Radar Conference, p. 117–122, April 1975).

SUMMARY OF THE INVENTION

It is therefore an object of the present invention to provide a moving target indication radar, which requires a memory device much smaller in capacity than the magnetic disc needed for the MTD and consequently easy to manufacture by the use of LSI's.

It is another object of the invention to provide a moving target indication radar in which the zero-Doppler-speed components of the radar signal are eliminated only through the DFT processing together with other finite-Doppler-speed components without resorting to an MTI canceller.

In the present invention, the correlation processing in the azimuthal direction is performed for every n-th (e.g., every 8th) unit azimuth region lying in an area covered by a predetermined number (64, for example) of such unit azimuth regions. If necessary, the similar correlation processing is concurrently performed for a predetermined number of unit range regions. The latter processing in the range direction may be exactly like the one for the MTD.

In an ordinary radar for the air traffic control use, the azimuthal spread of a target becomes rarely larger than 10 or 14 unit azimuth regions (factors responsible for this include the beam width, the antenna revolution rate, and the radar pulse repetition frequency). Therefore, a target has very little contribution to the averaged radar return levels. In contrast, a clutter has a greater azimuthal and range spread contributing greatly to the average. Consequently, the subtraction of the averaged value from the unit range-azimuth region radar data brings out not only the target returns of higher levels than clutter but also those of lower levels, while eliminating the clutter which is inherently comparable in level to the averaged value. The correlation processing in the present invention is performed in the manner outlined above.

It should be noted that the averaging with respect to every n-th (e.g., every 8th) unit azimuth regions has made it possible to markedly reduce the memory capacity needed for the signal processing to the extent that the memory as a whole can be made solely of LSI devices.

BRIEF DESCRIPTION OF THE DRAWINGS

The invention will now be described referring to the accompanying drawings, in which.

DESCRIPTION OF THE PREFERRED EMBODIMENT

Figure 1:
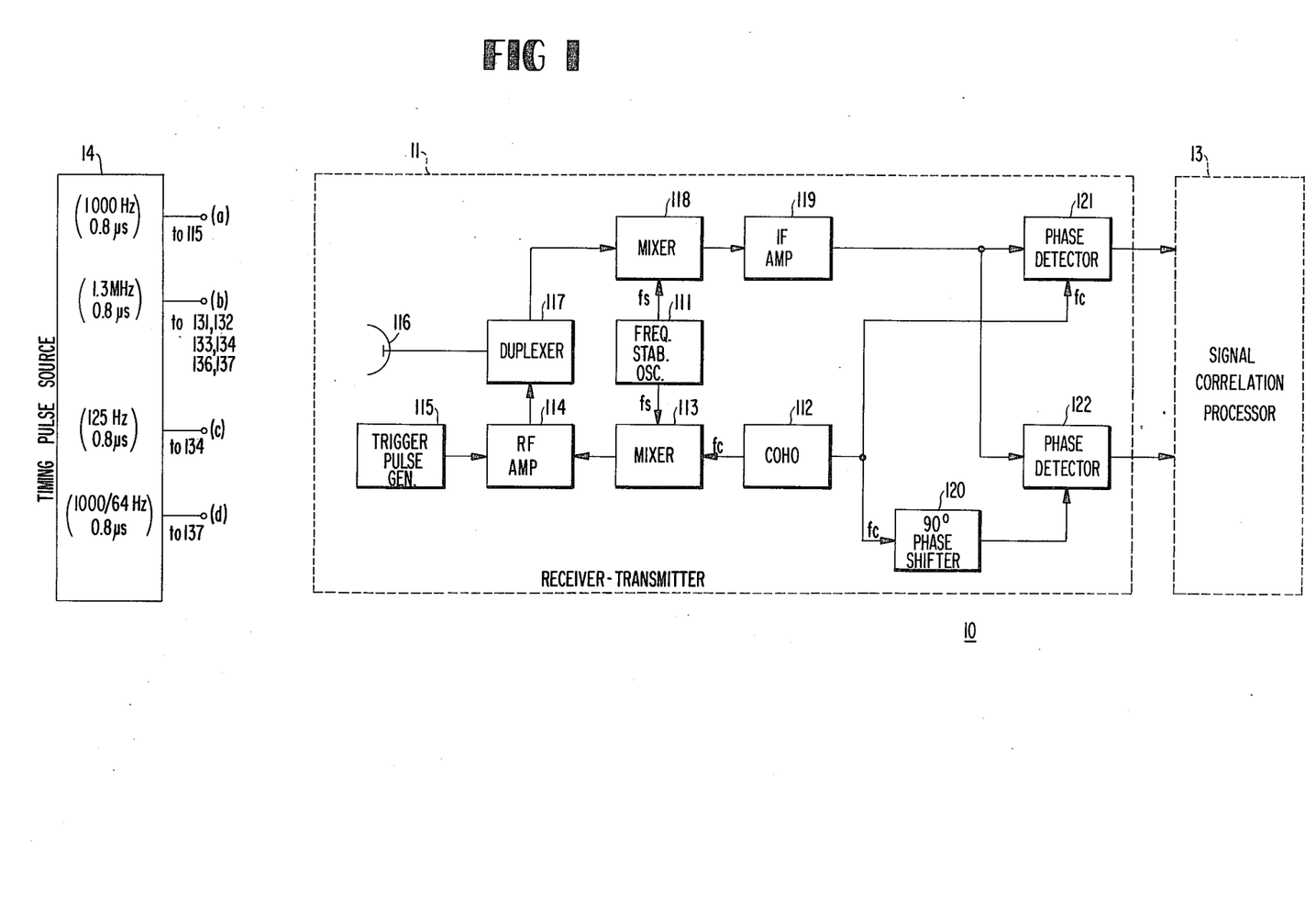
FIG. 1 is a block diagram of an embodiment of the present invention.

Referring first to FIG. 1, moving target indication radar 10 of the present invention has a receiver-transmitter portion 11 similar to the conventional one, a signal correlation processor portion 13, and a timing pulse source 14.

The receiver-transmitter portion 11 has a frequency-stabilized oscillator 111 for generating a microwave signal at frequency $f_s$, a coherent oscillator 112 of frequency $f_c$ for giving a reference phase for the radar signal detection by the transmitter-receiver portion 11, a first frequency mixer 113 for mixing the outputs of these oscillators 111 and 112 to provide an output of frequency $f_s+f_c$, a Klystron amplifier 114 for amplifying the output of the mixer 113, a trigger pulse generator 115 for pulse-modulating the amplifier 114 to provide a radar-transmitting pulse, and a duplexer 117 for leading the radar pulse to an antenna 116. Also, the transmitter receiver portion 11 has a second frequency mixer 118 for mixing the microwave oscillations supplied from the oscillator 111 and the radar return signal supplied from the antenna 116 and duplexer 117, to provide an IF signal of frequency, an IF amplifier 119 and a pair of phase detectors 121 and 122 connected in parallel to the IF amplifier 119 and supplied with the reference phase oscillation directly and through a 90° phase shifter 120 from the coherent oscillator 112, respectively.

The radar pulse of microwave frequency $f_s+f_c$ and of repetition frequency equal to the above-mentioned trigger pulse is transmitted through the antenna 116 and the radar return signal is led therethrough to the mixer 118. The Doppler speed components (including zero-Doppler speed components) of frequency deviation $f_d$ attributed to the stationary and moving objects lying in the scanned space are detected by the phase detectors 121 and 122 to form Doppler speed data or Doppler frequency data.

It is assumed here that this embodiment constitutes an ASR (airport surveillance radar). The pulse generator 115 responsive to a timing pulse supplied from terminal (a) of the pulse source 14 then generates a trigger pulse, 0.8 microseconds in width and 1000 Hz in repetition frequency. The revolution period of the antenna 116 is 4 seconds. Under these conditions, the transmitter-receiver portion 11 extracts the radar data with the whole azimuthal directions divided into 4000 unit azimuth regions. As for the range direction, the radar data are extracted for every one sixteenth nautical mile (nmi) corresponding to the pulse width, 0.8 microsecond, covering the whole 48 nmi nominal range.

As will be apparent from the description above, the radar of this embodiment is based on the radar data extraction from 4000 × 768 unit range-azimuth regions. Therefore, a pair of inphase and quadrature radar data are obtained at the output of the phase detectors 121 and 122 for every radar pulse (i.e., for every unit azimuth region) and for the first of the 768th unit range regions in that order. The analog radar rather thus obtained are supplied to the signal processor portion 13.

Figure 2:
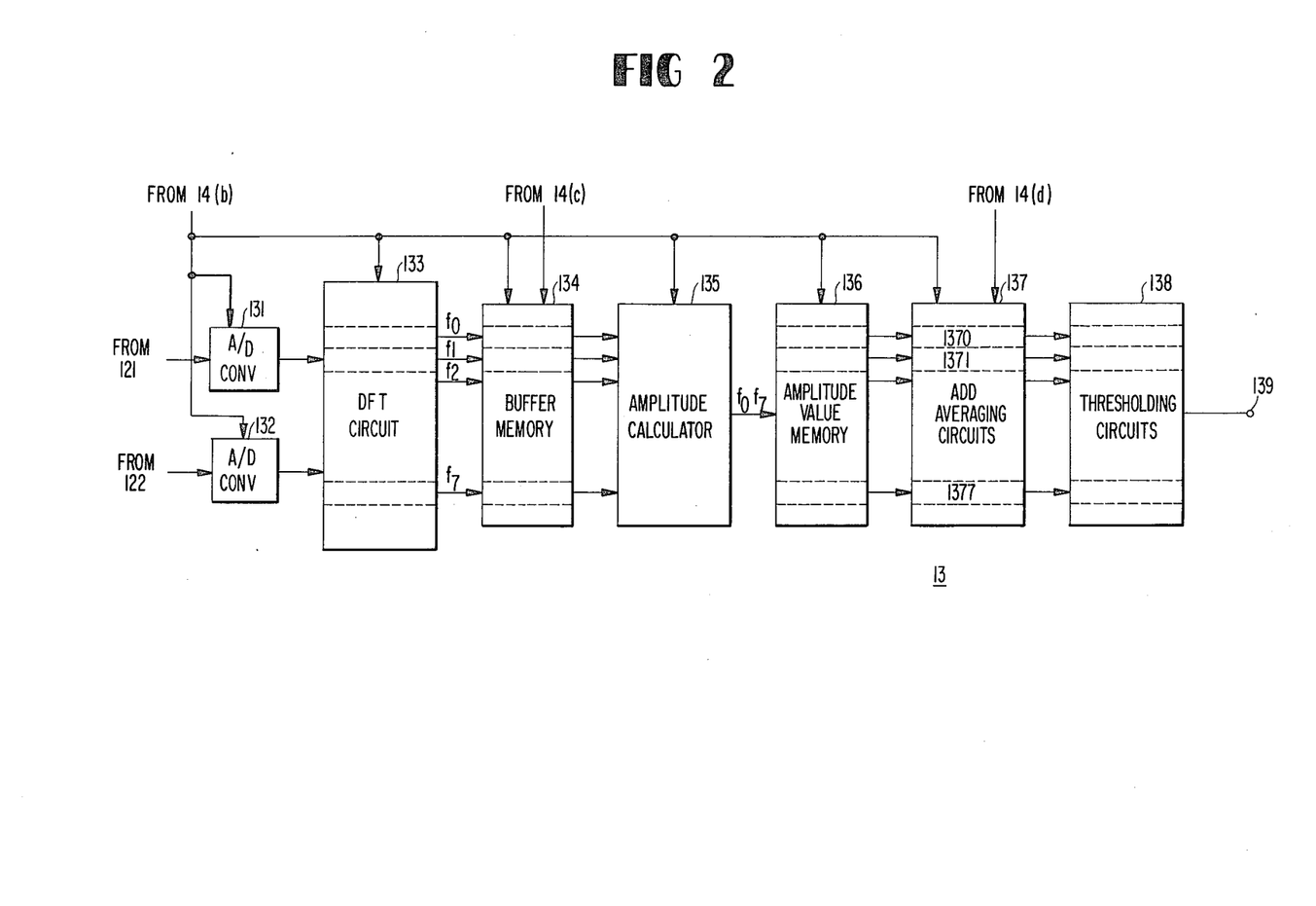
FIG. 2 is block diagram showing the details of the signal correlation processor shown in FIG. 1.

Referring to FIG. 2, the signal processor portion 13 shown therein in block form has a pair of A/D converters 131 and 132 for respectively digitizing the inphase and quadrature analog radar outputs applied from phase detectors 121 and 122, and 8-point DFT circuit 133 responsive to the outputs of A/D converters 131 and 132 supplied as the real and imaginary parts of the data needed for the frequency analysis for converting the radar data to a set of 8 Doppler frequency components $f_0$ to $f_7$ as in the case of the MTD. (For details of the DFT circuit, reference is made to H. H. Halpern and R. P. Perry "Digital Matched Filters using Fast Fourier Transforms," Eascon Conference Recorders 1971, p. 222-230). After the lapse of an initial build up period (e.g., 8-radar pulse repetition periods), the 8-point DFT circuit 133 provides a set of the Doppler frequency components every time it is supplied with the digitized radar data from the A/D converters 131 and 132.

The A/D converters 131 and 132 produce 10-bit binary codes for in phase and quadrature phase analog radar data, respectively. These data are extracted from each of the 768 unit range regions contained in every unit azimuth region. More specifically, these converters 131 and 132, being supplied with the 1.3 MHz clock pulse from the terminal (b) of the timing pulse source 14 in synchronism with the radar scanning pulse, converts into a binary signal of 13 Mb/s the abovementioned analog radar data incoming at a rate of 4000 sets per scan (1 set corresponding to one unit azimuth region) each having 768 pairs of the unit range region data. Thus, the converters 131 and 132 are adapted to perform the digitization within 0.8 microsecond for each of the unit range data to permit the real-time processing of the radar signal.

The 8-point DFT circuit 133 is supplied with the same clock pulse as the one for the converters 131 and 132 and generates after the lapse of the above-mentioned initial build-up period, a set of the Doppler frequency components $f_0$ to $f_7$ every time the digitized radar data is supplied with an interval of 0.8 microsecond for every unit range region. It will be noted here that the DFT circuit 133 is equivalent in its function to a set of eight bandpass filters of extremely narrow pass band having center frequencies close to each other. In this embodiment, 14 bits are assigned to each DFT output corresponding to the 10-bit A/D converter output pair.

As stated in the E. O. Brigham et al paper titled "Fast Fourier Transform," IEEE Spectrum, December 1967, p. 63–70, the fast Fourier transform performed at the circuit 133 involves 12-time (the square of 8, the number of sections for the circuit 133) complex multiplications and additions for every unit range data. The clock pulse frequency 1.3 MHz is set to meet this requirement.

The Doppler frequency components $f_0$ and $f_7$ are supplied from the circuit 133 to the buffer memory 134 with 14 bits assigned to every unit range data. To realize the above-mentioned averaging for every 8-th unit azimuth region, the buffer memory 134 is supplied from the terminal (c) of the timing pulse generator 14 with a 125 Hz gate pulse one eighth of the radar pulse repetition frequency) in addition to the clock pulse. The buffer memory 134 is thus designed to store 8 sets of 768 unit range data (each composed of 14 bits) for each one of the eight Doppler frequency components $f_0$ and $f_7$. Therefore, the capacity needed for the memory 134 is given by $$8 \times 8 \times 14 \times 768 = 688,000 \text{ bits.}$$

This amounts to only one fifth of the capacity needed for the above-mentioned MTD. Thus, the above-mentioned write-in of the radar data makes it possible to cover 64 unit azimuth regions by the use of memory sufficient only for 8 unit azimuth regions.

The contents of the buffer memory 134, i.e., the Doppler frequency components, $f_0$ and $f_7$, expressed in complex form, are then supplied to an amplitude calculator 135.

Figure 3:
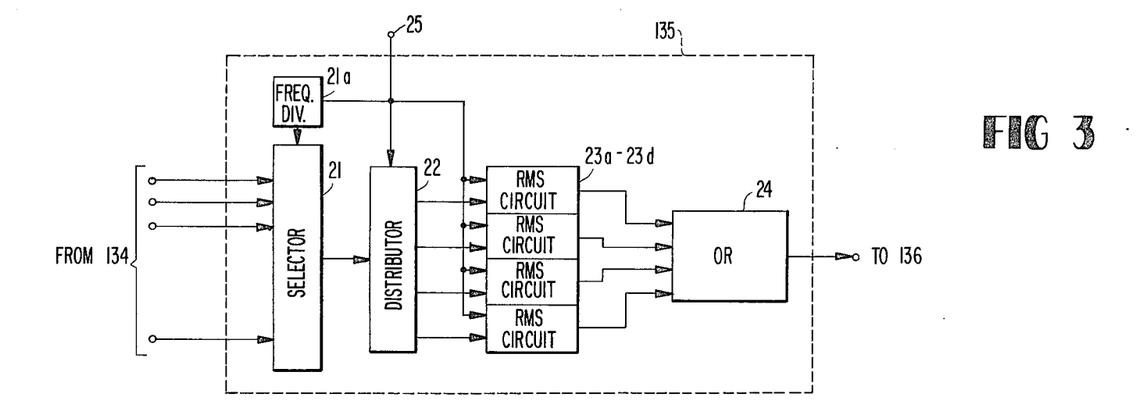
FIGS. 3 and 4 are block diagrams showing the details of the amplitude calculator shown in FIG. 2.
Figure 4:
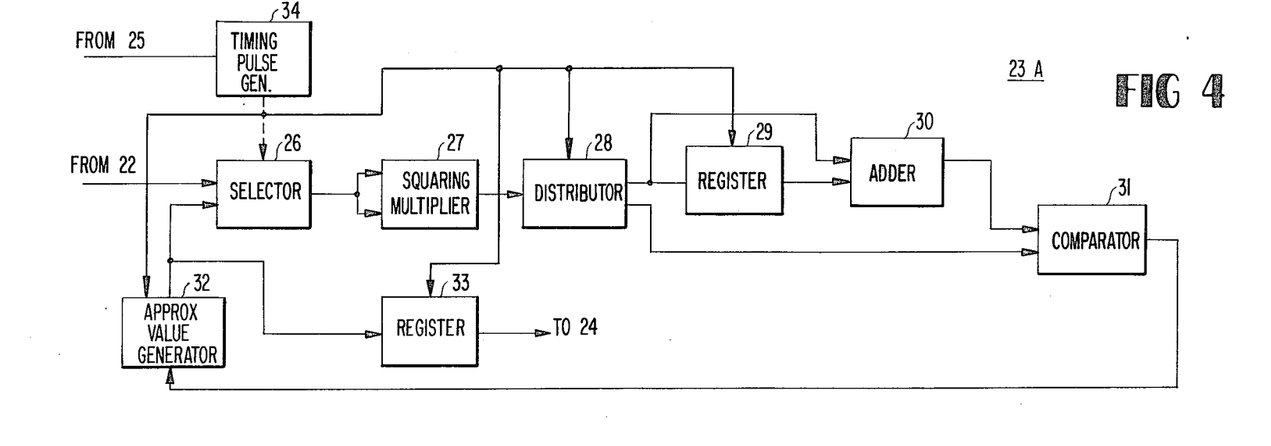

Referring to FIGS. 3 and 4, description will now be given about the amplitude calculator 135 shown in FIG. 2.

Referring first to FIG. 3, the calculator 135 has a selector 21 responsive to a timing pulse from a frequency divider 21a (to be described later) for selecting one of the Doppler frequency components to $f_0$ to $f_7$ supplied from buffer memory 134, a distributor 22 responsive to another timing pulse (to be described later) for distributing stepwise to its four output terminals the Doppler frequency component $f_i$ ($i=0, 1, 2, \ldots$ or 7) selected by the selector 21, a root-mean-square (RMS) circuits 23A to 23D, an OR circuit 24 for leading the outputs of these circuits 23A to 23D to the calculated amplitude value memory 136, and a timing pulse input terminal 25 for a timing pulse supplied to the frequency divider 21a, distributor 22, and the circuits 23A to 23D. Selector 21 has a function of extracting once for every 8 radar sweeps the Fourier transform outputs that emerge from the buffer memory 134 for every radar sweep, and of providing at its output the extracted Doppler frequency components $f_0$ to $f_7$ at a rate of one component for one radar sweep period in the order $f_0$ to $f_7$.

The amplitude calculator 135 is adapted to perform the calculation on 8 sets of the Doppler frequency components $f_0$ to $f_7$ within the 8 pulse repetition period. The operational speed required of the calculator 135 is therefore such that the RMS calculations be performed at a rate of one Doppler frequency component $f_i$ for every one pulse repetition period, i.e., 1 millisecond.

The Doppler frequency component $f_i$ selected stepwise by the selector 21 is subjected to the calculation successively at the circuits 23A to 23D. For this purpose, the distributor 22, supplied with the 1.3 MHz clock pulse from the terminal 25, is driven stepwise with a time lag of 0.8 microsecond, for every two adjacent ones of circuits 23A to 23D, so that the calculation for the component $f_i$ may be shared by these circuits in time division fashion. A segment of the component $f_i$ supplied to one of the circuits 23A to 23D in this manner is processed within a time period four times as large as 0.8 microsecond while other neighboring segments are processed within equal time periods, respectively, at the rest of the circuits 23A to 23D in 0.8-microsecond shifted time positions. This calculation of one Fourier frequency component $f_i$ is completed when each of the circuits 23A to 23D repeats the segment-by-segment calculation 192 times (i.e., 768/4 times). Upon completion of the calculation for the component $f_i$, the selector 21 is switched to $f_{i+1}$ to subject it to the same calculation. To permit the selector 21 to perform this stepwise switching, it is supplied with the driving pulse from the frequency divider, which is for dividing the clock pulse at the terminal 25 by a factor of 768 to 1.

It will be apparent from the foregoing description that the calculation for all the Doppler frequency components $f_0$ to $f_7$ is completed within the 8-scanning-pulse period.

The RMS circuit 23A will now be described referring to FIG. 4, the same description being applicable to other circuits 23B to 23D common in structure to the first-mentioned one.

As shown in FIG. 4, the RMS circuit 23A has a selector 26 for dividing each of the above-mentioned segments into a real part X and an imaginary part Y of a complex form supplied to a 14×14 bit squaring multiplier 27, a distributor 28, a register 29 connected to one of the output terminals of the distributor 28, an adder 30 for adding the outputs of the distributor 28 a register 29 connected to one of the output terminals of the distributor 28, and the register 29, a comparator 31 for comparing the outputs from another output of the distributor 28 and the adder 30, an approximated value generator 32 for generating a binary approximated value in response to the output from the comparator 31, a register 33 for storing a binary signal representative of the desired $\sqrt{X^2 + Y^2}$ value supplied from the generator 32, and a timing pulse generator 34 responsive to the clock pulse at the terminal 25 for providing timing pulses to keep the circuit 23A in timed relation with other structural elements of the amplitude calculator 135.

Selector 26 selects those data to be squared in response to trigger pulses supplied from timing pulse generator 34. More specifically, the real part X is selected first and then the imaginary part Y to calculate $X^2 + Y^2$. In the succeeding period, two approximated values are selected and squared for the comparison with $X^2 + Y^2$. The difference obtained out of the comparison is compensated for and the compensated difference is selected for further comparison to achieve the root-mean-squaring.

In operation, the real part X of the segment of the Doppler frequency component $f_i$ supplied from the distributor 22 is allowed to pass through the selector 26 and multiplied at the multiplier 27 to provide $X^2$, which is stored in the register 29 through the distributor 28. In synchronism with the storing of the value $X^2$, the imaginary part Y of the same segment is led through the selector 26 to the multiplier 27 to provide $Y^2$. Simultaneously, the value $X^2$ is read out from the register 29 and applied to the adder 30 together with the $Y^2$ value to provide an output $X^2 + Y^2$.

The approximated value generator 32 supplied with the output $X^2 + Y^2$ delivers to the selector 26 a first approximation value in the form of a digital code having the most significant bit (MSD) 1 followed by the second or less significant bits 0 (i.e., the first binary approximation value 100 ...). The approximation value is allowed to pass through the selector 26 and squared at the multiplier 27 and then applied to the comparator 31 through the distributor 28.

At the comparator 31, the comparison is performed between the value $X^2 + Y^2$ and the squared approximation value. The result of the comparison is fed back to the circuit 32. If the value $X^2 + Y^2$ is smaller than the squared approximation value, the generator 32 delivers a second approximation value in the form of a similar code 0100 .... and supplies it to the multiplier 27 through the selector 26. Conversely, if the value $X^2 + Y^2$ is greater than the squared approximation value, the second approximation value to be fed back is 1100 ....

It will be apparent that the 14 time repetition of the above-mentioned comparison and feedback determines bit-by-bit the 14 bit code for the square root value $\sqrt{X^2 + Y^2}$ in the order for the most significant to least significant bits. The binary output thus obtained is supplied bit-by-bit to the register 33 and then to the OR circuit 24.

As described above, the Doppler frequency components $f_0$ to $f_7$ supplied from the buffer memory 134 are converted by the circuis 23A to 23D into the amplitude-representing binary codes successively and stored in the buffer memory 136.

Figure 5:
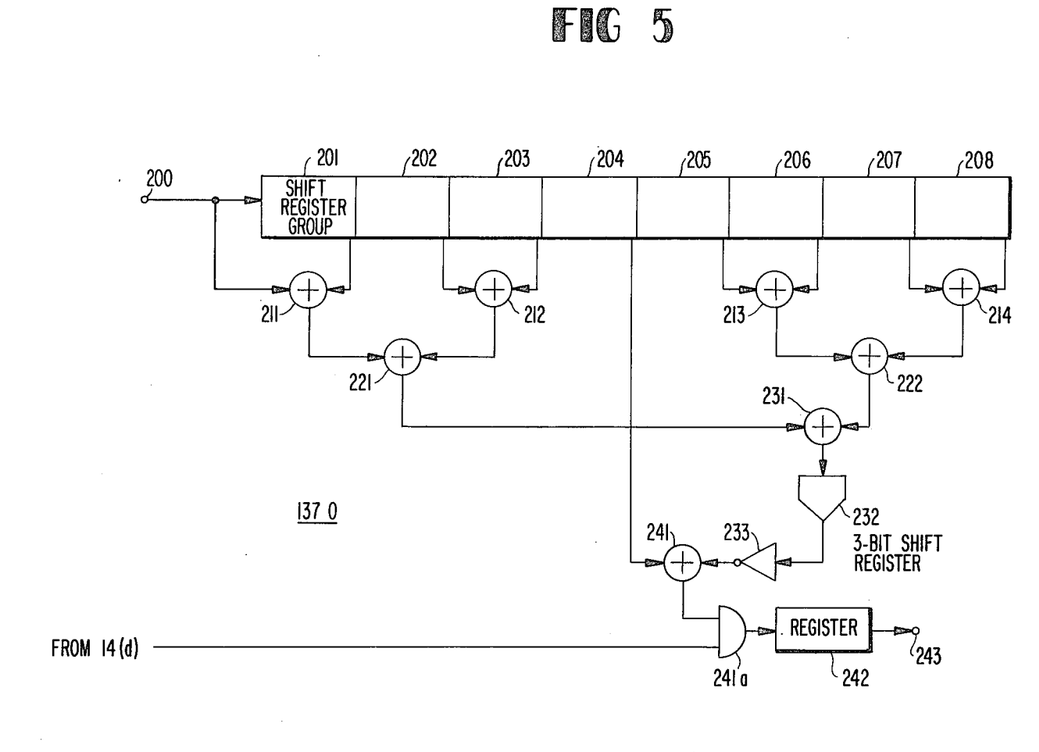
FIGS. 5 and 6 are block diagrams showing the details of a part of the correlation processing circuit shown in FIG. 2.
Figure 6:
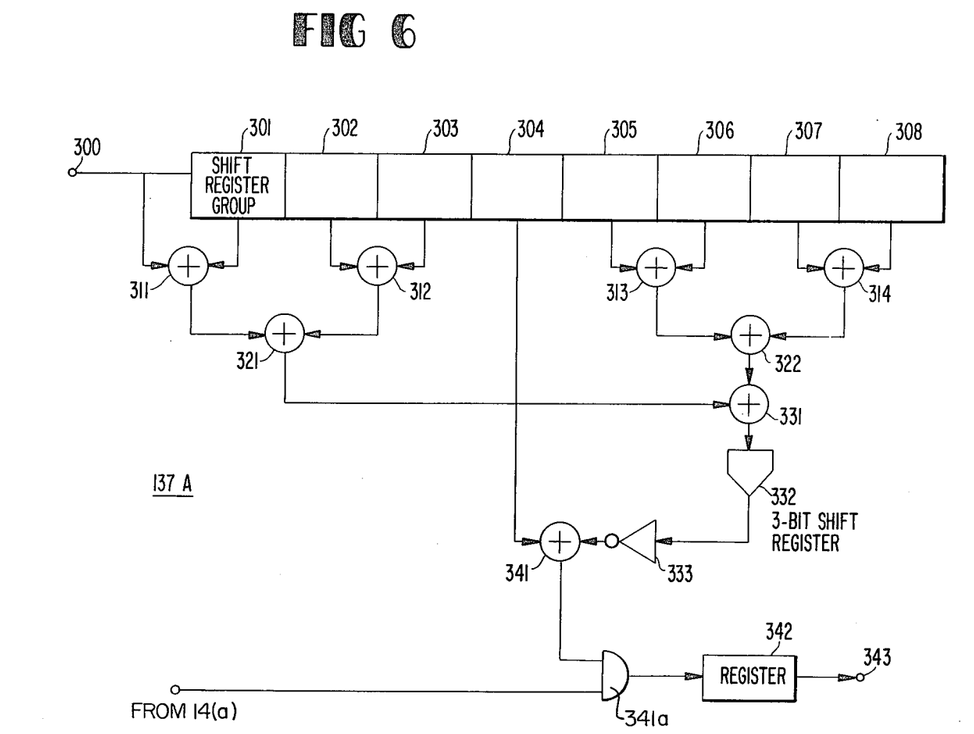

Referring now to FIGS. 5 and 6, the correlation processing circuit 137 (FIG. 2) will be described.

FIG. 5 schematically shows an add-averaging circuit 1370, which is assigned to the Doppler frequency component $f_0$ and constitutes the circuit 137 together with other identical circuits assigned to components $f_i$ to $f_{7i}$ (see FIG. 2).

The circuit 1370 has an input terminal 200 for receiving from the buffer memory 136 the calculated amplitude value for the Doppler frequency component $f_0$, and shift register groups 201 to 208 cascaded with each other. Each of the register groups 201 to 208 has 768 × 14 binary stages to store 768 unit range data of the component $f_0$ in response to a timing pulse of 125 Hz (i.e., 1000/8 Hz). To permit the storing for every 8th unit azimuthal data, the register groups 201 to 208 are supplied from the terminal (c) of the source 14 with the above-mentioned 125 Hz timing pulse together with the clock pulse. This intermittent write-in at the registers 201 to 208 makes it possible to store the calculated amplitude values for the every 8th unit azimuth regions spreading over the 64 unit azimuth regions.

The circuit 1370 further comprises adders 211, 212, 213 and 214. The input terminals of the adder 211 are connected to the input terminal 200 and the 768th or the final stage of the register group 201. Similarly, the input terminals of the adder 212 are connected to the respective final stages of the register groups 202 and 203, those of the adder 213 to the respective final stages of the groups 205 and 206, and those of the adder 214 to the respective final stages of the groups 207 and 208. The outputs of the adders 211 and 212 are in turn connected to the inputs of an adder 221, those of the adders 213 and 214 to those of another adder 222, and those of the adders 221 and 222 to a still another adder 231. The output of the adder 231 undergoes a 3-bit shifting (A one-eighth dividing a decimal calculation constitutes the averaging) at the 3-bit shift register 232 and supplied to a further adder 241 through a polarity inverter 233. To the other input terminal of the adder 241 is applied the output from the final stage of the shift register group 204 to achieve the subtraction of the average amplitude level from the return amplitude level peculiar to the unit azimuth region lying in the center of the 64 unit azimuth regions covered by the shift register groups 201 to 208. The output of the adder 241 is AND gated at a gate 241A supplied with a timing pulse from 14(d) for read out. The gated output is led to output terminal 243 after being registered at register 242. The same add-averaging as that of the circuit 1370 is performed for each of the other Doppler frequency components $f_1$ to $f_7$ by the circuits 1371 to 1377 arranged in parallel with the circuit 1370 (FIG. 2). Thus, the add-averaging is performed for all the components $f_0$ to $f_7$, constituting the the overall correlation processing.

While the correlation processing in the azimuth direction by the add-averaging circuit 1370 for the component $f_0$ is ordinarily sufficient to eliminate stationary and moving clutters, the simultaneous use of the similar processing in the range direction is preferred in those cases where the scanned space contains such terrain as a coast line extending radially but having very little azimuthal spread. Such processing in the range direction is achieved by a range-direction add-averaging circuit 137A to be disposed at a stage prior to the input terminal 200.

The circuit 137A shown in FIG. 6, composed of a combination of shift registers and adders, is quite similar in its structure to the circuit 1370 shown in FIG. 5. The description will therefore be omitted with like structural elements in FIGS. 5 and 6 being denoted by like reference numerals with their respective third digits changed from 2 to 3. It should be noted that the circuit 137A is for the component $f_0$, the identical circuits being provided for other circuits 1371 to 1377 assigned to components $f_1$ to $f_7$.

In FIG. 6 the shift register groups 301 to 308 each composed of 14 × 8 binary stages are designed for the add-averaging of only 8 unit range data. Except that the region covered by the correlation processing is much smaller than that done by the azimuthal correlation processing, the circuit 137A is identical in its structure and function to the circuit 1370 as stated above.

The circuit 137A may be dispensed with in ordinary radar operation. Even if needed, it is easy to manufacture, because the memory capacity amounts only to 14 × 8 × 8 (= 896) bits covering with 14-bit unit range data the eight unit range regions for each of the Doppler frequency components $f_0$ to $f_7$.

The correlation processing output thus obtained is applied to a thresholding circuit 138 and to a radar display device (not shown) via output terminal 139.

Figure 7:
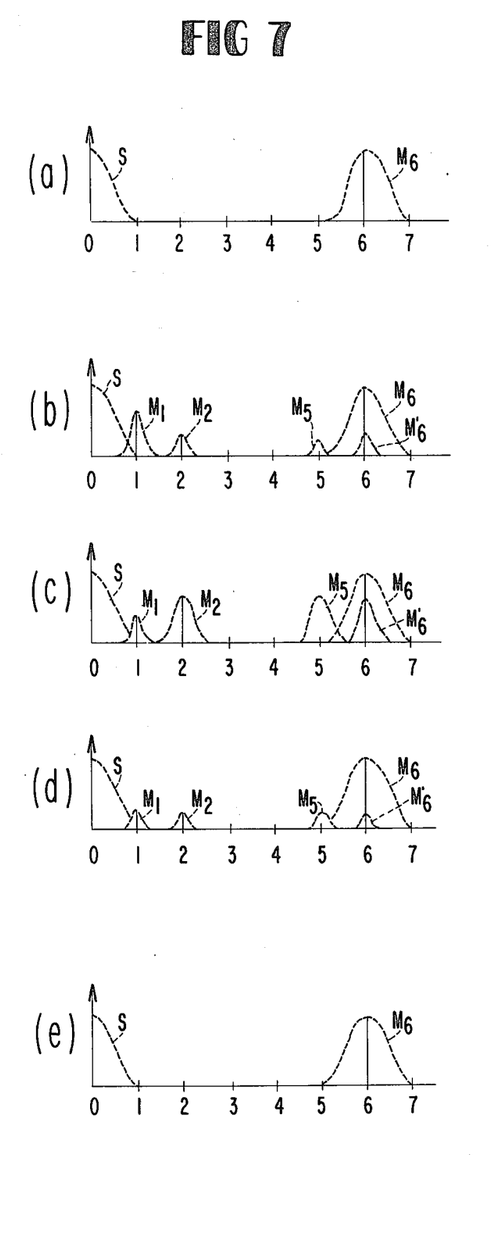
FIGS. 7 and 8 are graphs showing waveforms illustrating the function of the present invention.
Figure 8:
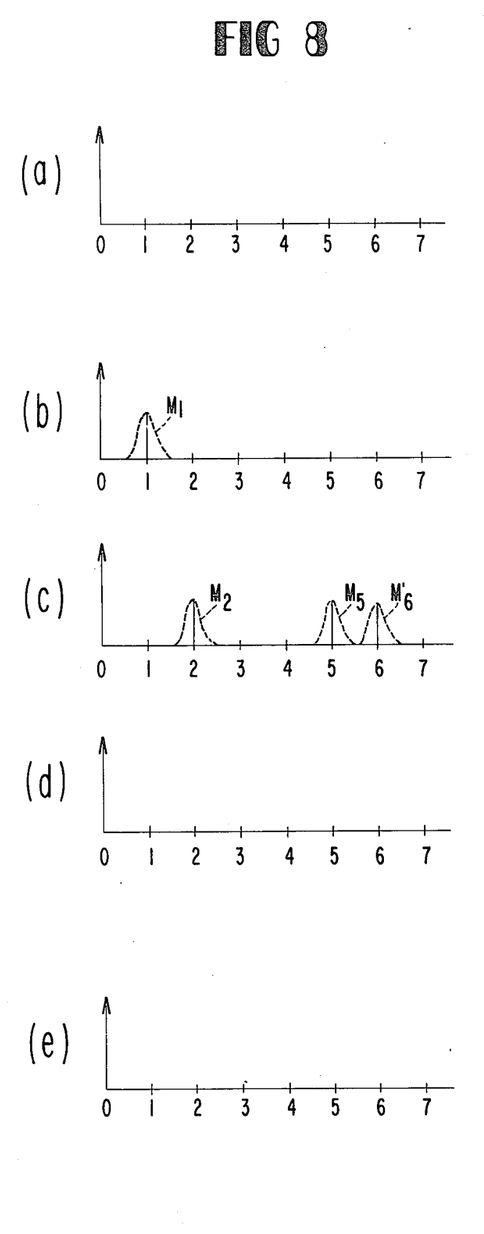

Referring to FIGS. 7 and 8, the clutter elimination effect achieved by the present invention will be described. For simplicity, the description will be given only of the azimuthal correlation processing. It will be apparent that the same description is applicable to the processing in the range direction except that the area covered by the processing is much smaller.

Referring to FIG. 7 (a), one range analog value equivalent to one of the outputs of the amplitude calculator circuit 135 obtained at the 8-scanning pulse period is shown against the Doppler frequency sections 0 to 7 corresponding to components $f_0$ to $f_7$ taken along the abscissa. As shown, this data has its frequency components in sections 0 and 6. The component in section 0 represents a return from a stationary object S while that in section 6 represents a moving object $M_6$ of a fairly high relative speed.

FIG. 7(b) is a similar illustration for the same range after the lapse of a period several times as large as the 8 pulse repetition period. As shown, there are moving objects $M_1$, $M_2$, $M_5$ and $M_6'$ in sections 1, 2, , and 6 in addition to the above-mentioned objects S and $M_6$ lying in sections 0 and 6.

Similarly, FIGS. 7(c) and (d) show the change of the above-mentioned returns falling in the same range as viewed after the lapse of the 8 pulse repetition period and 16 pulse repetition period from the time point of FIG. 7(b), respectively. FIG. 7(e) is another similar illustration for the same range after the lapse of several times the 8 radar pulse repetition.

The radar returns illustrated in FIGS. 7(a) to (e) show that there is little difference in S of secton 0 and $M_6$ of section 6, signifying that these objects have fairly large azimuthal spreads. In contrast, the return components $M_1$, $M_2$, $M_5$, and $M_6'$ have very little azimuthal spreads.

Since the above-described correlation processing at circuits 1370–1377 is performed on these return components on the section-by-section basis, i.e., separately for each of the sections 0 to 7 of FIGS. 7(a) to (e), the components S and $M_6$ contributing greatly to the average value are eliminated, allowing the components $M_1$, $M_2$, $M_5$, and $M_6'$ to be detected as moving targets. FIG. 8 shows the results of this processing.

As will be apparent from the above illustration, the stationary clutter S and moving clutter $M_6$ are removed to bring out not only the ordinary moving targets $M_1$, and $M_2$ and $M_5$ but also such target $M_6'$ of lower level than the clutter level.

As will be readily understood from the foregoing description, the present invention makes it possible to markedly reduce the memory capacity needed for the correlation processing to the extent that the memory as a whole can be made only of LSI devices. Also, it should be noted that the present invention has greatly simplified the processor as a whole by the use only of the 8-point DFT circuits without resorting to an MTI canceller.

In the embodiments, the radar scanning pulse may be of multiple repetition frequency, employing two or more repetition frequencies switched from one another at a predetermined interval.

Also, the amplitude computation at the calculating circuit 137 may be replaced by a suitably programmed general purpose processor. Similarly, the interval of the intermittent write-in at the buffer memory 134 may be 4 radar pulse interval or 16 radar pulse interval. Needless to say, a larger interval makes it possible to further reduce the memory capacity but only at the expense of the elimination effect on those clutter of smaller azimuthal spreads. Conversely, a smaller interval leads to a greater memory capacity, impairing the technological advantage of the invention.

The Doppler frequency sections may be 4 or 16 in number in place of 8. However, a four-point DFT means a poorer frequency selectivity, which results in the obscuring of the desired target indication by moving clutter. Conversely, a 16-point DFT complicates the correlation processor as a whole.

The radar pulse width, i.e., 0.8 microsecond, may be smaller or larger depending on the field of use in which the present radar is placed. When the width is set smaller, the response speed of the DFT circuit 133 and the amplitude calculating circuit 137 must be higher.

Since various other modifications can be made with the invention, it should be understood that the technical scope of the invention covers all that is defined by the accompanying claims.

What is claimed is:

1. A moving target indication radar comprising:
   a. a radar signal analog processing portion including:
      i. a constant-rate rotating antenna,
      ii. means for transmitting at intervals through said antenna a microwave pulse of a predetermined frequency and width,
      iii. means for receiving pulse returns from stationary and moving objects lying in the space scanned by said antenna, said pulse returns being received for every unit azimuthal region corresponding to one microwave pulse in the form of a chain of unit data respectively for unit range region defined by the width of said microwave pulse, and
      iv. means for processing the received pulse returns to produce Doppler frequency data,
         wherein said means for processing comprises phase detecting means for providing in phase and quadrature phase analog data signals representing real and imaginary parts of the Doppler frequency data, and
   b. a radar signal digital processing portion including:
      i. means for converting said Doppler frequency data to a digital signal,
         wherein said means for converting Doppler frequency data to a digital signal receives said in phase and quadrature phase analog signals and generates first and second digital words representing real and imaginary parts of the Doppler frequency data, and said means for dividing the converted digital signal into a plurality of digital Doppler frequency components is a discrete Fourier transform circuit,
      ii. means for dividing the converted digital signal into a plurality of digital Doppler frequency components,
      iii. a buffer memory connected to store the outputs of said dividing means at an interval equal to an integral multiple of the transmitting interval, and
      iv. means for averaging the outputs of the buffer memory which represent the data of a plurality of every $n$-th (n is an integer) one of said unit azimuthal regions and for subtracting the average output from the data for the substantial center unit of said plurality of unit azimuthal regions, whereby the returns from said stationary and moving objects having a considerable azimuthal spread are substantially eliminated to bring out those returns from moving targets of limited azimuthal spreads.

2. A moving target indication radar as recited in claim 4 further comprising second means for averaging the outputs of the buffer memory which represent the data of a plurality of said unit range regions and for substracting the average output from the data for the substantial center unit of said plurality of unit range regions, whereby the returns from said stationary and moving objects having considerable range spreads are substantially eliminated to bring out those returns from moving objects of limited range spreads.

3. A moving target indication radar as recited in claim 2, wherein said second means for averaging comprises second correlation processing means for adding a plurality of range levels stored in said second buffer memory for each unit range region and substracting the average amplitude level for the unit range region from the amplitude level for said substantial center unit range region.

4. A moving target indication radar as recited in claim 1, wherein said means for averaging the outputs of the buffer memory comprises:
   a. amplitude calculating means for computing the root-mean-square value for each output of the discrete Fourier transform circuit stored in said buffer memory,
   b. a second buffer memory connected to store the outputs of said amplitude calculating means, and
   c. correlation processing means for adding the plurality of every n-th amplitude levels stored in said second buffer memory for each unit azimuthal region and subtracting the average amplitude level for the unit azimuthal region from the amplitude level for said substantial center unit azimuthal region.

5. A moving target indication radar as recited in claim 4, wherein said amplitude calculating means comprises:
   a. means connected to the buffer memory storing the outputs of said discrete Fourier transform circuit for selecting the real and imaginary parts of the Doppler frequency data of one of said outputs,
   b. squaring means for squaring said real and imaginary parts of the Doppler frequency data selected by said selecting means,
   c. means for adding the squared real and imaginary parts of said Doppler frequency data, and
   d. means for generating the square root of the sum of said squared real and imaginary parts of the Doppler frequency data.

6. A moving target indication radar as recited in claim 5, wherein said correlation processing means comprises:
   a. n shift register groups connected in cascade,
   b. first adding means for generating the sum of the output of said second buffer memory means and the outputs of the last stage of the first $(n-2)/2$ shift register groups,
   c. second adding means for adding the outputs of the last stage of each of the last $(n/2)$ shift register groups,
   d. third adding means for summing the outputs of said first and second adding means, and
   e. subtracting means for subtracting the output of said third adding means from the output of the last stage of the $n/2$-th shift register group.

7. A moving target indication radar as recited in claim 6 wherein $n$ is 8.

* * * * *

UNITED STATES PATENT AND TRADEMARK OFFICE
CERTIFICATE OF CORRECTION

PATENT NO. : 4,053,885
DATED : October 11, 1977
INVENTOR(S) : Yuichi TOMITA, et al Page 1 of 3

It is certified that error appears in the above-identified patent and that said Letters Patent are hereby corrected as shown below:

IN FOREIGN APPLICATION PRIORITY DATA:

Delete "Apr. 3, 1976" and insert -- Apr. 3, 1975 --

IN THE SPECIFICATION:

Column 1, line  3 - insert -- BACKGROUND OF THE INVENTION -- line 48 - delete "angle" insert --angel -- line 59 - delete "Rayleight" insert -- Rayleigh -- line 61 - after "logarithmic" insert -- amplifier -- line 63 - after "receiver" insert -- . --

Column 2, lines 20-21 - delete "problem" insert -- purpose -- line 53 - delete "digitalized" insert -- digitized --

UNITED STATES PATENT AND TRADEMARK OFFICE
CERTIFICATE OF CORRECTION

PATENT NO. : 4,053,885
DATED : October 11, 1977
INVENTOR(S) : Yuichi TOMITA, et al It is certified that error appears in the above-identified patent and that said Letters Patent are hereby corrected as shown below:

Column 3, line 11 - delete "doppler" insert -- Doppler -- line 12 - after "azimuth" insert -- - -- line 37 - delete "azimuth"

Column 5, line 7 - after "116" insert -- , -- line 34 - delete "of" insert -- to -- line 35 - after "radar" insert -- data -- line 49 - delete "Recorders" insert -- Records -- line 63 - after "above" insert -- - --

Column 6, line 32 - delete " and" insert -- to -- line 40 - after "memory" insert -- device -- line 43 - delete "and" insert -- to --

UNITED STATES PATENT AND TRADEMARK OFFICE
CERTIFICATE OF CORRECTION

PATENT NO. : 4,053,885
DATED : October 11, 1977
INVENTOR(S) : Yuichi TOMITA, et al It is certified that error appears in the above-identified patent and that said Letters Patent are hereby corrected as shown below:

Column 7, line 34 - delete "8-scanning-pulse" and insert -- 8 pulse repetition -- lines 46-48 - delete "a register 29...distributor 28,"

Column 8, line 48 - delete "$f_i$ to $f7i$" insert -- $f_1$ to $f_7$ --

Column 10, line 45 - delete "and" (first occurrence).

Signed and Sealed this

Seventh Day of March 1978

[SEAL]

Attest:

RUTH C. MASON
Attesting Officer

LUTRELLE F. PARKER
Acting Commissioner of Patents and Trademarks